US012271599B2

(12) United States Patent
Goda

(10) Patent No.: US 12,271,599 B2
(45) Date of Patent: Apr. 8, 2025

(54) INFORMATION PROCESSING APPARATUS FOR PROVIDING NOTIFICATION OF A READ-OUT ERROR IN A NON-VOLATILE STORAGE DEVICE

(71) Applicant: CANON KABUSHIKI KAISHA, Tokyo (JP)

(72) Inventor: Keigo Goda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 17/930,001

(22) Filed: Sep. 6, 2022

(65) Prior Publication Data

US 2023/0071982 A1    Mar. 9, 2023

(30) Foreign Application Priority Data

Sep. 9, 2021  (JP) ................ 2021-146789

(51) Int. Cl.
*G06F 3/06* (2006.01)
*G06F 9/4401* (2018.01)
*G06F 11/10* (2006.01)

(52) U.S. Cl.
CPC .......... *G06F 3/0616* (2013.01); *G06F 3/0632* (2013.01); *G06F 3/0679* (2013.01); *G06F 9/4401* (2013.01); *G06F 11/1068* (2013.01)

(58) Field of Classification Search
CPC .... G06F 3/0616; G06F 3/0632; G06F 3/0679; G06F 9/4401; G06F 11/1068; G06F 21/575; H04N 1/00477; H04N 1/00928; H04N 1/32683
See application file for complete search history.

(56) References Cited

U.S. PATENT DOCUMENTS

| 6,058,047 A * | 5/2000 | Kikuchi ............... G11C 29/765 |
| | | 714/E11.038 |
| 2013/0148435 A1* | 6/2013 | Matsunaga .......... G06F 3/0619 |
| | | 365/185.23 |
| 2014/0365714 A1* | 12/2014 | Sweere ................. G06F 1/206 |
| | | 711/103 |
| 2020/0097660 A1* | 3/2020 | Goda ....................... G06F 8/65 |

FOREIGN PATENT DOCUMENTS

JP    2021026319 A    2/2021

* cited by examiner

*Primary Examiner* — Larry T Mackall
(74) *Attorney, Agent, or Firm* — Canon U.S.A., Inc. IP Division

(57) ABSTRACT

An information processing apparatus includes a non-volatile semiconductor storage device storing a startup related program, a notification unit configured to provide notification of information, and a controller having one or more processors which executes instructions stored in one or more memories. The controller is configured to determine whether the startup related program is falsified, obtain life information of the semiconductor storage device, and determine whether the life information satisfies a condition. In a case where the controller determines that the startup related program is falsified and the life information satisfies the condition, the notification unit provides notification of at least information about a remaining life of the semiconductor storage device.

17 Claims, 8 Drawing Sheets

INFORMATION PROCESSING APPARATUS FOR PROVIDING NOTIFICATION OF A READ-OUT ERROR IN A NON-VOLATILE STORAGE DEVICE

BACKGROUND OF THE DISCLOSURE

Field of the Disclosure

The present disclosure relates to an information processing apparatus and a control method for the information processing apparatus.

Description of the Related Art

Recently, a solid-state drive (SSD) has been generally used as a storage device in an information processing apparatus. However, it is generally known that repeated writing of data to the SSD reduces the life of a FLASH Memory® used as a storage medium.

If the life of the memory in the SSD is reduced, the information processing apparatus may not operate normally. For example, if the life of the SSD is reduced, the data written to the SSD may be garbled and abnormal data may be read out.

As a countermeasure technique against the reduced life of the SSD in the information processing apparatus, for example, a technique discussed in Japanese Patent Application Laid-open No. 2021-26319 is used. With the technique, in a case where the life of the SSD is determined to be reduced, an operation is switched to execute a job without using the SSD.

Meanwhile, from the viewpoint of security, some recent information processing apparatuses include a falsification detection function that checks the presence or absence of firmware falsification at startup and provides notification if firmware falsification is detected.

In such information processing apparatuses, in a case where firmware is unable to be read out normally due to the reduced life of the SSD, there is a possibility that the falsification detection function may determine that the falsification is detected even though the firmware is not falsified. This is because the falsification detection function may erroneously determine that program falsification is detected in a case where the contents of program data read out from the SSD are different from the normal data due to garbled bits in the FLASH® memory.

In other words, even though there is a possibility that the firmware has not been read out successfully due to the reduced life of the SSD, it is difficult to provide notification of an error caused by the short life of the SSD.

SUMMARY OF THE DISCLOSURE

According to an aspect of the present disclosure, an information processing apparatus including a non-volatile semiconductor storage device storing a startup related program includes an application included in firmware, a notification interface configured to provide notification of information, and a controller having one or more processors which executes instructions stored in one or more memories, the controller being configured to determine whether the application is falsified, obtain life information of the semiconductor storage device in a case where the controller determines that the application is falsified, and determine whether the life information satisfies a condition, wherein the semiconductor storage device stores an application list including management information about the application, wherein the controller determines whether the application list is falsified, obtain the life information in a case where the controller determines that the application list is falsified, and determines whether the life information satisfies the condition, and wherein the notification interface provides the notification of at least the information about the remaining life of the semiconductor storage device in a case where the controller determines that the life information satisfies the condition.

Further features of the present disclosure will become apparent from the following description of exemplary embodiments with reference to the attached drawings.

DESCRIPTION OF THE EMBODIMENTS

Exemplary embodiments of the present disclosure will be described in detail with reference to the attached drawings. The exemplary embodiments described below are not intended to limit the present disclosure according to the claims, and not all combinations of features described in the exemplary embodiments are essential to the solving means of the present disclosure. In the exemplary embodiments, an image forming apparatus is described as an example of an information processing apparatus. However, the exemplary embodiments are not limited thereto.

Figure 1:
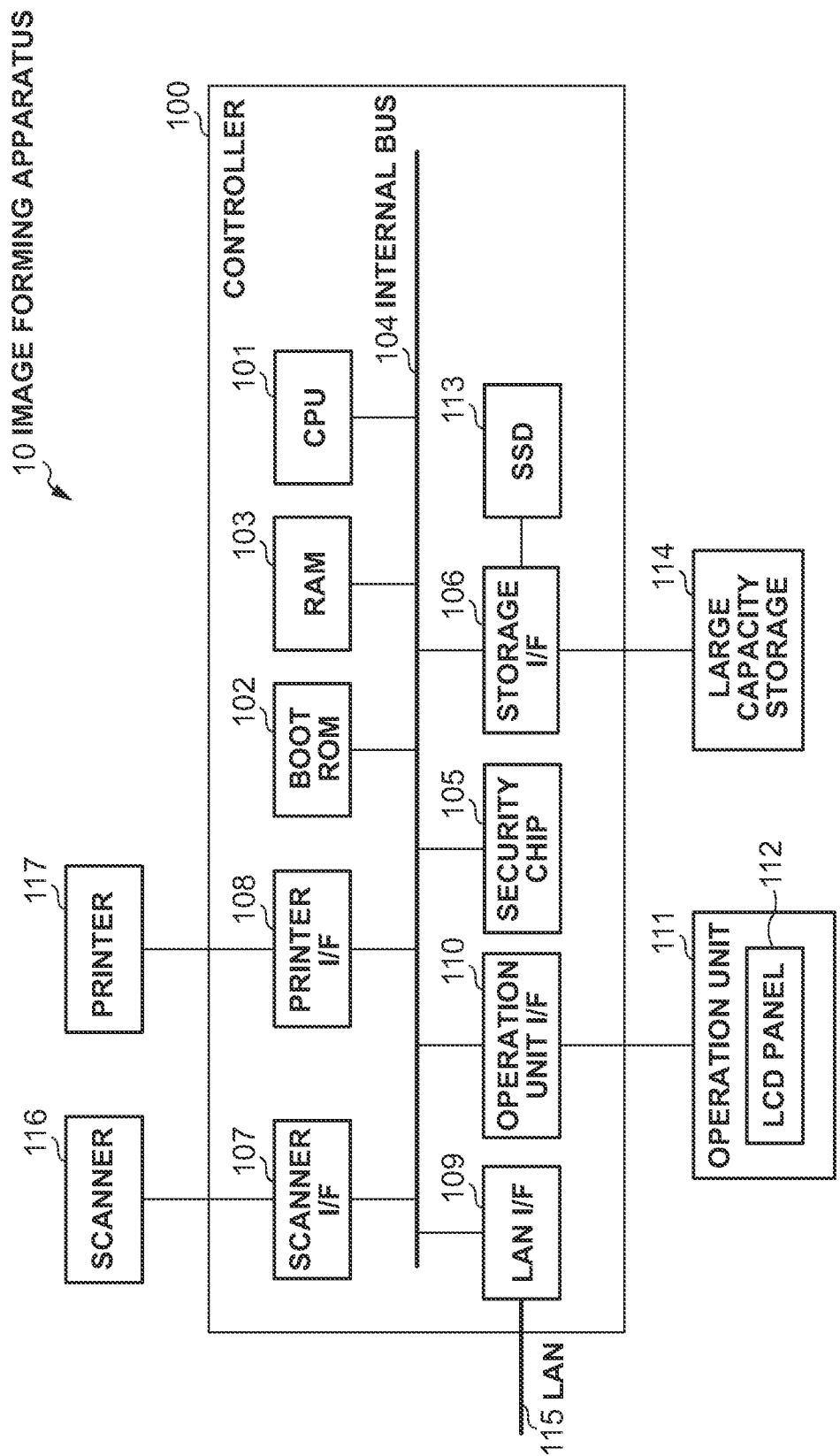
FIG. 1 is a block diagram of an image forming apparatus.

FIG. 1 is a block diagram illustrating an image forming apparatus 10 according to a first exemplary embodiment.

The image forming apparatus 10 according to the present exemplary embodiment includes a scanner 116, a printer 117, an operation unit 111, a large capacity storage 114, and a controller 100.

The scanner 116 optically reads an image on a document and converts the read image into a digital image. The printer 117 outputs the digital image to a paper medium. The operation unit 111 is used to operate the image forming apparatus 10. The large capacity storage 114 stores the digital image and the like. The controller 100 is connected to these devices and can execute a job in the image forming apparatus 10 by issuing instructions to modules thereof.

The image forming apparatus 10 can perform input and output of digital images from and to an external computer, issue jobs, and issue instructions to an apparatus, via a local area network (LAN) 115.

The controller 100 is a general-purpose central processing unit (CPU) system. The controller 100 includes a CPU 101 controlling the entire system, a boot read-only memory (ROM) 102 storing an initial program called Basic Input/

Output System (BIOS), and a random access memory (RAM) 103 used by the CPU 101 as a main storage memory. These components are connected to each other via an internal bus 104. In addition, a solid-state drive (SSD) 113 serving as a storage device, a storage interface (I/F) 106 for controlling the large capacity storage 114, and a security chip 105 are connected to the internal bus 104. The boot ROM 102 storing the BIOS is a read only memory, and the contents thereof cannot be rewritten.

The security chip 105 has a function of verifying a digital signature included in firmware to be executed by the CPU 101 to determine whether the firmware is falsified. The security chip 105 also has a function of calculating a hash value of any digital data using a hash function. The security chip 105 according to the present exemplary embodiment can calculate the hash value using the generally known SHA-256 algorithm.

The SSD 113 and the large capacity storage 114 according to the present exemplary embodiment are compliant with Serial Advanced Technology Attachment (SATA) standards, which is an industry-standard. The SSD 113 is a semiconductor storage device using a FLASH® memory as a storage medium, and has a function called Self-Monitoring, Analysis and Reporting Technology (SMART). The CPU 101 can obtain various kinds of diagnostic information from the SSD 113 by using the SMART function. It is possible to identify the deterioration state of the FLASH® memory based on this diagnostic information.

The SSD 113 stores firmware which is a program to be executed by the CPU 101 to operate the image forming apparatus 10. The firmware stored in the SSD 113 is loaded into the RAM 103 by the BIOS and executed by the CPU 101 at startup of the image forming apparatus 10. While the SSD 113 is used in the present exemplary embodiment, another non-volatile semiconductor storage device such as an embedded MultiMediaCard (eMMC) may be used.

The large capacity storage 114 is used to, for example, to store digital image data read by the scanner 116 when the image forming apparatus 10 executes a job. In order to store a large number of digital images each having a large data amount, a large capacity storage device is generally used. As the large capacity storage 114, for example, a hard disk device is used, but a large capacity SSD may be used.

The scanner 116 is connected to the controller 100 via a scanner I/F 107. The scanner 116 reads a document to generate image data. The printer 117 is connected to the controller 100 via a printer I/F 108. The printer 117 prints an image on a sheet based on the image data. The LAN 115 is connected to the controller 100 via a LAN I/F 109, and the operation unit 111 is connected to the controller 100 via an operation unit I/F 110. The operation unit 111 includes a liquid crystal display (LCD) panel 112 for displaying various kinds of information to a user, and operation buttons (not illustrated).

Figure 2:
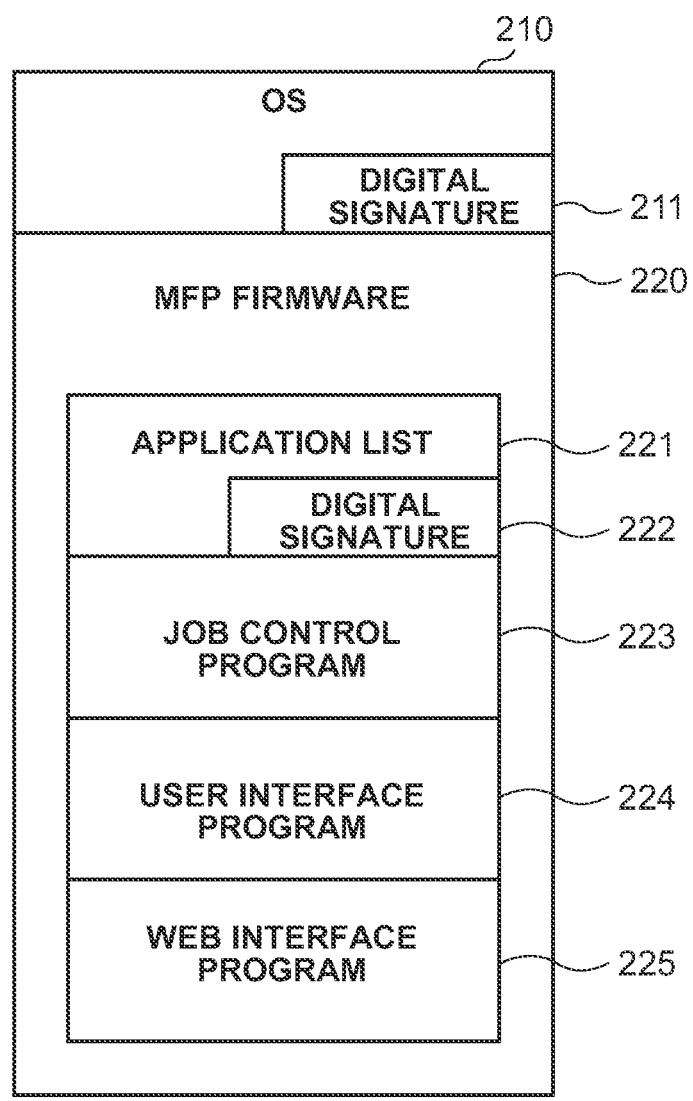
FIG. 2 is a diagram illustrating storage contents in a solid-state drive (SSD).

FIG. 2 illustrates storage contents in the SSD 113 of the image forming apparatus 10. The SSD 113 stores a program to be executed by the CPU 101, and the program is loaded into the RAM 103 and executed at the startup of the image forming apparatus 10.

The SSD 113 stores an operating system (OS) 210 and multifunction peripheral (MFP) firmware 220.

The OS 210 controls the hardware modules of the controller 100.

The MFP firmware 220 is an application program to be executed on the OS 210, and various functions of the image forming apparatus 10 are implemented by the CPU 101 executing the MFP firmware 220. The MFP firmware 220 may include a single application program or may include a plurality of application programs. The MFP firmware 220 according to the present exemplary embodiment includes the following three application programs.

A job control program 223 is a program for controlling execution of various jobs such as a copy job and a print job by controlling the scanner 116 and the printer 117.

A user interface program 224 is a program for displaying various kinds of information on the LCD panel 112 and for receiving user operations via the operation unit 111.

A Web interface program 225 is a program for processing communication between an external computer using a Web browser and the image forming apparatus 10 via the LAN 115.

The above-described configuration is merely an example. Alternatively, the MFP firmware 220 may additionally include other application programs, or may include various kinds of data such as font data and display language translation data in addition to the programs.

The image forming apparatus 10 has a function of verifying whether a program to be executed by the CPU 101 is falsified at startup. The OS 210 includes a digital signature 211 used for verification and the verification is performed using a digital signature technique at startup.

However, the falsification detection processing using a digital signature takes relatively long time. The image forming apparatus 10 according to the present exemplary embodiment includes the plurality of application programs, and if verification using a digital signature is performed for each of the application programs similarly to the verification of the OS 210, the startup time of the image forming apparatus 10 becomes longer. Thus, the image forming apparatus 10 according to the present exemplary embodiment uses a method capable of reducing a time taken to perform the falsification detection processing on the application programs.

In the present exemplary embodiment, the image forming apparatus 10 uses a method of checking the presence or absence of falsification by calculating a hash value for the application program read from the SSD 113, and comparing the calculated hash value and a normal hash value calculated in advance. An application list 221 in the SSD 113 records normal hash values calculated in advance for the plurality of application programs. The hash value calculation is executable in a shorter time than the digital signature processing, and thus makes it possible to reduce a total time taken to perform the falsification verification processing in a case where the plurality of application programs is included in the image forming apparatus 10.

The image forming apparatus 10 is configured in such a manner that the presence or absence of falsification of the application list 221 is verified using a digital signature 222. Table 1 describes the contents of the application list 221. The application list 221 includes management information such as the names of the application programs included in the MFP firmware 220 and the hash values of the program data thereof calculated using the SHA-256 algorithm. The method for checking the presence or absence of falsification is not limited thereto.

TABLE 1

| Program Name | Hash Value |
| --- | --- |
| Job Control Program | 8e483f0e0fbf0889941122f59aa62189fdcfeded3b84f3e2250b320f69774dce |
| User Interface | fbeb9e7ab9563c55e96eabfa7baa5ce2958e9f6ebe023faa |

TABLE 1-continued

| Program Name | Hash Value |
|---|---|
| Program | 8ad8726dddc4fdbb |
| Web Interface | 1698af8c8bb5555649597860a4fcdd6f68becfce8de4a29c |
| Program | c3d2b5f606cd9230 |

Figure 4:
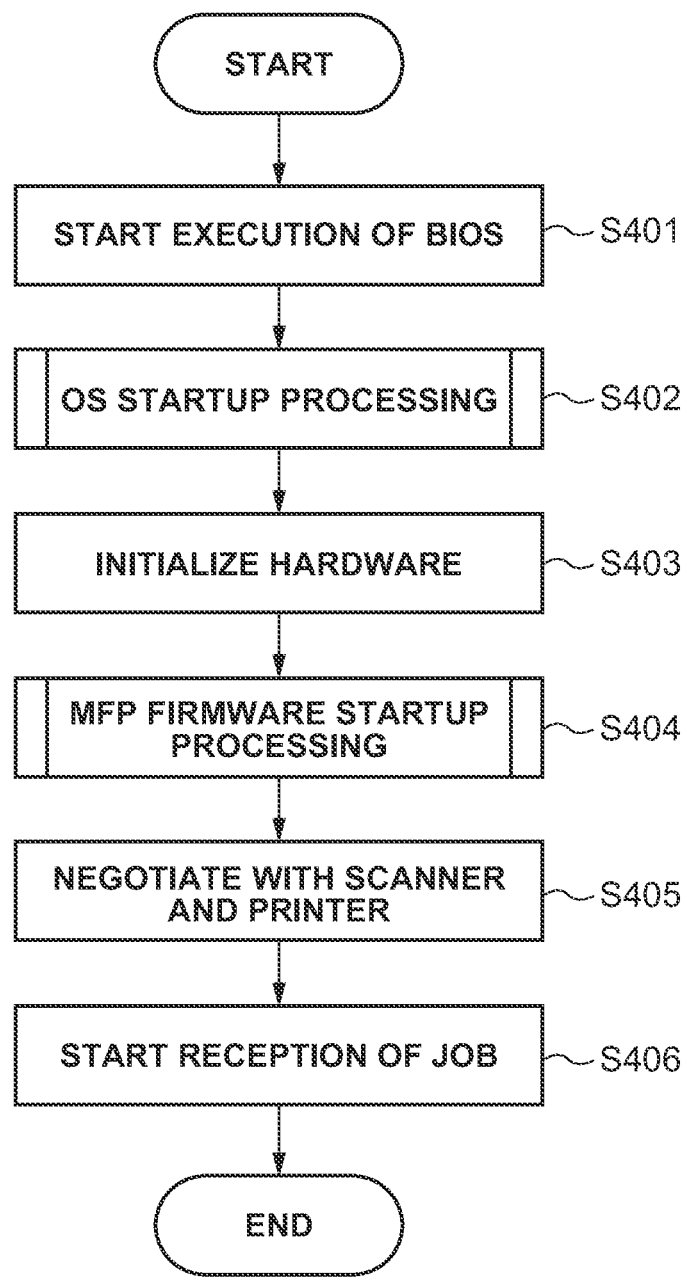
FIG. 4 is a flowchart illustrating startup processing by the image forming apparatus.

FIG. 4 is a flowchart illustrating a startup operation of the image forming apparatus 10 according to the present exemplary embodiment. The CPU 101 starts execution of the flowchart when a power switch (not illustrated) of the image forming apparatus 10 is turned on.

In step S401, the CPU 101 starts execution of the BIOS which is an initial program stored in the boot ROM 102.

In step S402, the CPU 101 executes startup processing on the OS 210. The processing in this step is implemented by the CPU 101 executing the BIOS. Details of the startup processing on the OS 210 will be described below with reference to FIG. 5. In the stage of completion of the processing in this step, the CPU 101 is in a state of executing the OS 210 loaded into the RAM 103.

In step S403, the CPU 101 initializes the hardware modules of the controller 100 by executing the program of the OS 210.

In S404, the CPU 101 executes startup processing on the MFP firmware 220. The startup processing on the MFP firmware 220 will be described below with reference to FIG. 6. Upon completion of the startup processing on the MFP firmware 220, the CPU 101 becomes a state of executing the application programs included in the MFP firmware 220, and processing thereafter is implemented by the CPU 101 executing the application programs.

In step S405, the CPU 101 performs negotiations with the scanner 116 and the printer 117 via the scanner I/F 107 and the printer I/F 108, respectively. This enables the scanner 116 and the printer 117 to be controlled from the CPU 101. More specifically, the CPU 101 causes the scanner 116 and the printer 117 to perform operation preparations.

In step S406, the CPU 101 starts reception of a job. Thereafter, the image forming apparatus 10 is ready to receive a job execution instruction from the user via the operation unit 111 or the LAN 115. Through such a flowchart, the image forming apparatus 10 completes the startup operation.

In the following description, the startup processing on the OS 210 and the startup processing on the MFP firmware 220, which are features of the present exemplary embodiment, will be described.

Figure 5:
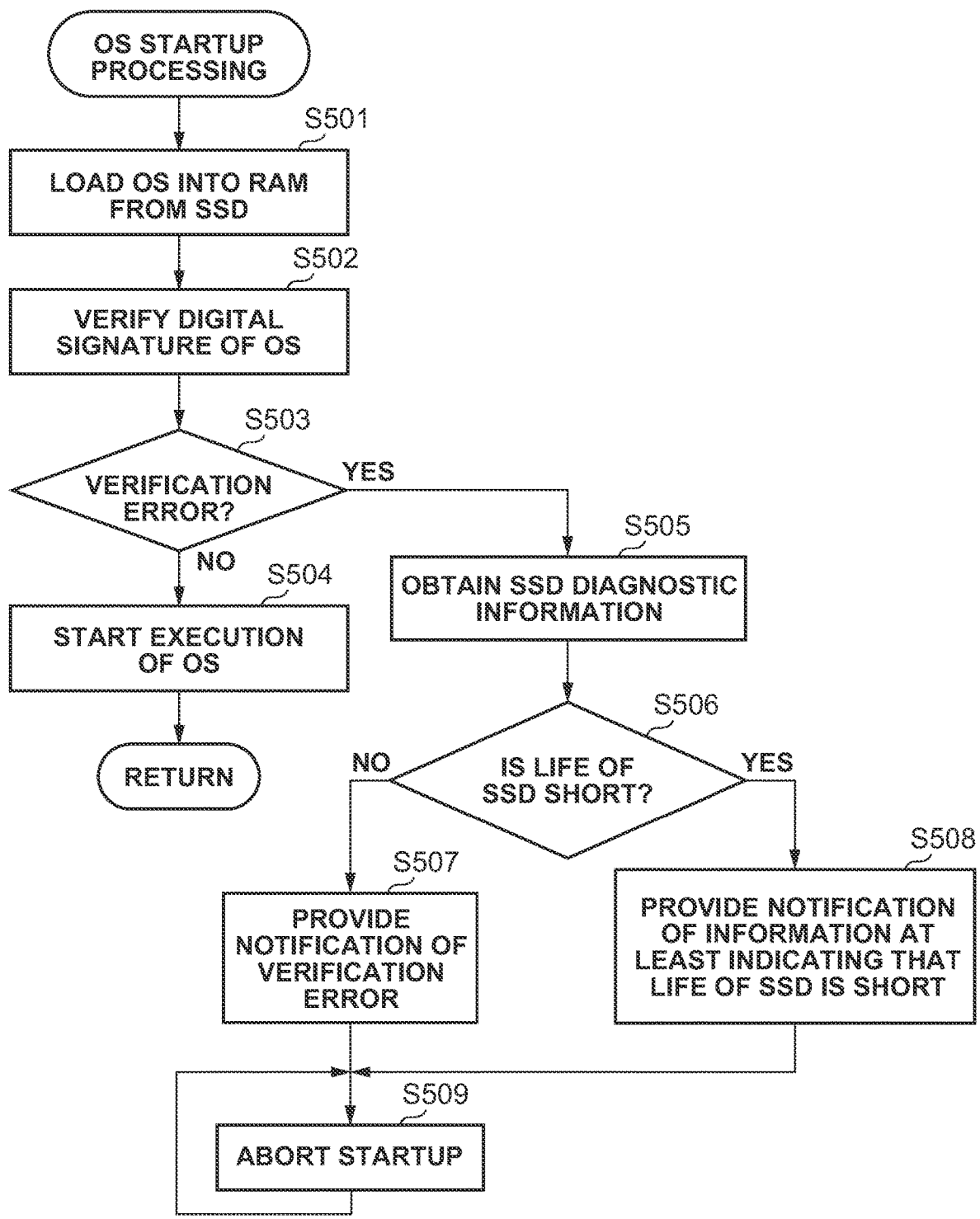
FIG. 5 is a flowchart illustrating operating system (OS) startup processing.

FIG. 5 is a flowchart illustrating details of the startup processing on the OS 210 described above. In step S402 in FIG. 4, the CPU 101 starts execution of the flowchart.

In step S501, the CPU 101 controls the SSD 113 to load the OS 210 into the RAM 103 from the SSD 113. In step S502, the CPU 101 verifies the digital signature 211 of the OS 210 using the security chip 105 in order to determine whether the OS 210 loaded in the RAM 103 is falsified.

In step S503, the CPU 101 makes the determination based on a result of the verification of the digital signature 211. If the CPU 101 determines that a verification error occurs (the OS 210 is falsified) (YES in step S503), the contents of the OS 210 loaded into the RAM 103 are not normal. In this case, the processing proceeds to step S505. If the CPU 101 determines that no verification error occurs (NO in step S503), the OS 210 is normal and the processing proceeds to step S504.

In step S504, i.e., after the CPU 101 determines that the verification result on the OS 210 is normal (the OS 210 is not falsified), the CPU 101 starts execution of the OS 210 loaded in the RAM 103. Then, the processing proceeds to step S403 in FIG. 4.

On the other hand, in step S505, i.e., after the CPU 101 determines that the verification result on the OS 210 is not normal, the CPU 101 obtains the diagnostic information of the SSD 113 using the SMART function of the SSD 113.

In step S506, the CPU 101 determines whether the life of the SSD 113 is short, based on the obtained diagnostic information. In the diagnostic information obtained from the SSD 113, the number of times of occurrence of an abnormality detected in the SSD 113 is counted for each of items (life information), such as the number of read-out errors, the number of alternative processing-pending sectors, and the number of alternative processing-completed sectors. In a case where one of these values exceeds a predetermined threshold value, the CPU 101 determines that the life of the SSD 113 is short. The diagnostic information described above is merely an example, and the determination may be made based on other diagnostic information.

If the CPU 101 determines that the life of the SSD 113 is short (the life information satisfies a condition) (YES in step S506), there is a possibility that the verification error of the OS 210 is caused by the deterioration of the SSD 113, and the processing proceeds to step S508. If the CPU 101 determines that the life of the SSD 113 is not short (NO in step S506), the processing proceeds to step S507.

Figure 3A:
FIGS. 3A, 3B, and 3C are diagrams each illustrating an example of a screen displayed when notification of an error is provided.

In step S507, i.e., after the CPU 101 determines that the life of the SSD 113 is not short (the life information does not satisfy the condition), the CPU 101 provides notification that the result of the firmware verification by the falsification detection function is an error. More specifically, the CPU 101 displays an error code on the LCD panel 112. FIG. 3A is an example of a screen displayed in this case. Then, the processing proceeds to step S509. Instead of the screen of FIG. 3A, the CPU 101 may display at least one of an error cord or an error reason (a verification error).

Figure 3B:

On the other hand, in step S508, i.e., after the CPU 101 determines that the life of the SSD 113 is short, the CPU 101 provides notification of information at least indicating that the life of the SSD 113 is short. For example, the CPU 101 provides notification of information indicating that the life of the SSD 113 is short, and information indicating that the result of the firmware verification by the falsification detection function is an error. Because the CPU 101 determines that the verification error occurs in step S503 and the life of the SSD 113 is short in step S506, the CPU 101 provides notification of two conceivable factors. This enables the user to consider the two error factors. In the present exemplary embodiment, as an example, the CPU 101 displays on the LCD panel 112 a message indicating that the SSD 113 is in an over-used state, together with an error code, as illustrated in FIG. 3B. Then, the processing proceeds to step S509. Alternatively, only the error code may be displayed, only the error reasons (the short life and the verification error) may be displayed, or both the error code and the error reasons may be displayed.

In the present exemplary embodiment, the description is given of the example in which notification of the information indicating the firmware verification error is provided together with the information indicating that the life of the SSD 113 is short. However, the image forming apparatus 10 according to the present exemplary embodiment is configured to provide notification of at least the information indicating that the life of the SSD 113 is short. This is because the state where the life of the SSD 113 is short corresponds to a state where the SSD 113 is to be replaced in order to operate the image forming apparatus 10 stably. By restarting the image forming apparatus 10 after replacing the SSD 113, and determining whether a verification error occurs in step S503, it is possible to operate the image forming apparatus 10 stably after determining that no verification error occurs in step S503. Even after a verification error is determined to occur in step S503, it is possible to operate the image forming apparatus 10 stably after eliminating the verification error.

In the present exemplary embodiment, the information indicating that the life of the SSD 113 is short is described as an example, the present exemplary embodiment is not limited thereto. For example, any other information about the remaining life of the SSD 113 may be used, such as information indicating that the life of the SSD 113 does not satisfy a condition (is a threshold value or less, or less than the threshold value) or information prompting the replacement of the SSD 113.

In step S509, the CPU 101 aborts the startup of the image forming apparatus 10 because of the verification error of the OS 210, and terminates the processing in the flowchart to stop the image forming apparatus 10. The stopped image forming apparatus 10 is shut down by the user pressing a power button.

In the present exemplary embodiment, the configuration in which the image forming apparatus 10 is stopped until the user presses the power button is described. However, the image forming apparatus 10 may be automatically shut down after the elapse of a predetermined time.

Through the processing described above, the startup processing on the OS 210 is implemented.

Figure 6:
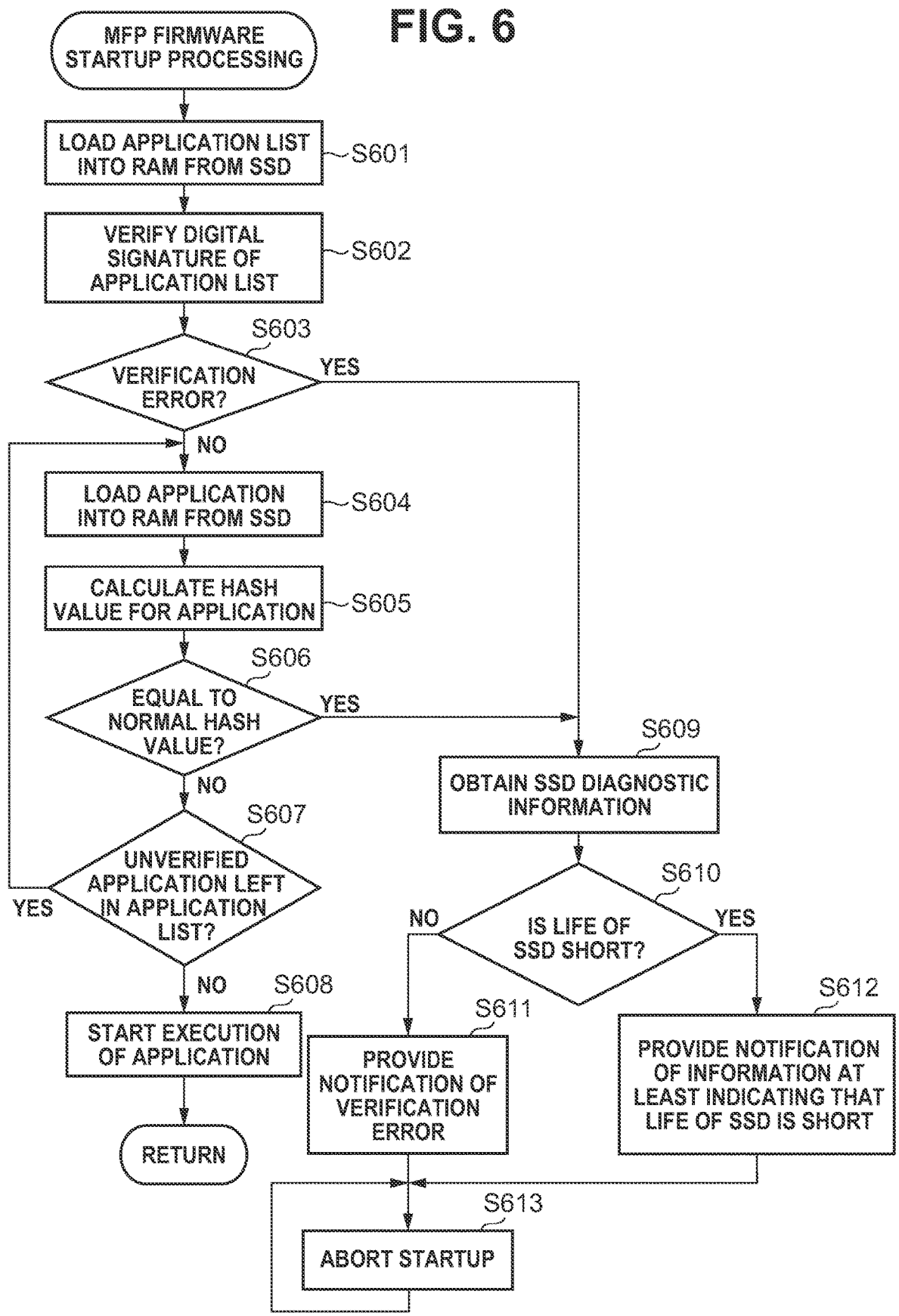
FIG. 6 is a flowchart illustrating multifunction peripheral (MFP) application program startup processing.

FIG. 6 is a flowchart illustrating details of the startup processing on the MFP firmware 220 described above. In step S404 in FIG. 4, the CPU 101 starts execution of this flowchart.

In step S601, the CPU 101 controls the SSD 113 to load the application list 221 into the RAM 103 from the SSD 113.

In step S602, the CPU 101 verifies the digital signature 222 of the application list 221 using the security chip 105 in order to determine whether the application list 221 is falsified.

In step S603, the CPU 101 makes the determination based on a result of the verification of the digital signature 222. If the CPU 101 determines that a verification error occurs (YES in step S603), the contents of the application list 221 loaded in the RAM 103 are not normal, and the processing proceeds to step S609. If the CPU 101 determines that no verification error occurs (NO in step S603), the application list 221 is normal and the processing proceeds to step S604.

In step S604, the CPU 101 controls the SSD 113 to load an unverified application program whose name is included in the application list 221 into the RAM 103.

In step S605, the CPU 101 calculates the hash value for the application program using the SHA-256 algorithm and the security chip 105 in order to determine whether the application program loaded into the RAM 103 in step S604 is falsified.

In step S606, the CPU 101 determines whether the hash value calculated in step S605 is equal to the normal hash value included in the application list 221. If the hash values are equal to each other (YES in step S606), the application program can be determined to be normal, and the processing proceeds to step S607. If the hash values are not equal to each other (NO in step S606), the processing proceeds to step S609.

In step S607, i.e., after the CPU 101 determines that the application program is normal, the CPU 101 determines whether an unverified application program is left in the application list 221. If the CPU 101 determines that an unverified application program is left (YES in step S607), the processing returns to step S604 to repeat the verification processing. If the CPU 101 determines that an unverified application program is not left (NO in step S607), the processing proceeds to step S608.

In step S608, the CPU 101 starts execution of all the application programs that have been verified through the processing described above. More specifically, the job control program 223, the user interface program 224, the Web interface program 225 are sequentially started up. The controller 100 according to the present exemplary embodiment can execute a plurality of application programs simultaneously in parallel using the function of the OS 210.

Then, the processing proceeds to step S405 in FIG. 4. On the other hand, in step S609, i.e., after the CPU 101 determines that the verification result on the application list 221 or the application program is not normal, the CPU 101 obtains the diagnostic information of the SSD 113 using the SMART function of the SSD 113.

In step S610, the CPU 101 determines whether the life information of the SSD 113 is shorter than the threshold value, based on the obtained diagnostic information. If the CPU 101 determines that the life of the SSD 113 is short (YES in step S610), there is a possibility that the verification error of the application list 221 or the application program is caused by the short life of the SSD 113. In this case, the processing proceeds to step S612. If the CPU 101 determines that the life of the SSD 113 is not short (NO in step S610), the processing proceeds to step S611.

In step S611, i.e., after the CPU 101 determines that the life of the SSD 113 is not short, the CPU 101 provides notification indicating that the result of the firmware verification by the falsification detection function is an error.

Similarly to the processing in step S507, the CPU 101 displays an error code on the LCD panel 112 as illustrated in FIG. 3A, and the processing proceeds to step S613.

On the other hand, in step S612, i.e., after the CPU 101 determines that the life of the SSD 113 is short, the CPU 101 provides notification of information at least indicating that the life of the SSD 113 is short. Processing in this step is similar to the processing in S508, and a detailed description thereof will thus be omitted.

In step S613, the CPU 101 aborts the startup of the image forming apparatus 10 and terminates the processing in the flowchart to stop the image forming apparatus 10. Through the processing described above, the startup processing on the MFP firmware 220 is implemented.

As described above, the image forming apparatus 10 according to the present exemplary embodiment enables the user to be notified that the SSD 113 has deteriorated, in a case where the falsification detection function is activated due to the deterioration of the SSD 113 that stores the firmware of the image forming apparatus 10. This enables the user to avoid an unnecessary concern about security due to an erroneous detection by the falsification detection function.

While in the present exemplary embodiment, the SSD 113 is compliant with the SATA standards, and the SMART function is used to obtain the diagnostic information, this configuration is merely an example. The SSD 113 may be compliant with other standards such as eMMC standards or Non-Volatile Memory Express (NVMe) standards, and the diagnostic information is not limited to the diagnostic information obtained using the SMART function. Further, the present exemplary embodiment is applicable to a storage device not using the FLASH® memory.

In the present exemplary embodiment, the security chip 105 is provided to verify the digital signatures 211 and 222 and to calculate the hash values for the application programs (the job control program 223, the user interface program 224, and the Web interface program 225). However, this configuration is merely an example. These functions may be implemented by software and the software may be executed by the CPU 101.

In the first exemplary embodiment, the example in which the life of the SSD 113 has been short in a case where the read out program is detected as being not normal has been described. However, some SSDs have a function of internally detecting the reduced life of the FLASH® memory, and providing notification of a read-out error in a case where a CPU tries to read out data recorded in a sector that causes an error.

The notification of the read-out error is not necessarily provided from the SSD depending on occurrence frequency of defective sectors of the internal FLASH® memory. However, at least in a case where the short life is internally detected in the SSD, the notification of the read-out error is provided.

Thus, in a second exemplary embodiment, a description will be given of an image forming apparatus including an SSD having a function of providing notification of a read-out error if the life is short.

A configuration according to the present exemplary embodiment is similar to the configuration according to the first exemplary embodiment except that the notification of the read-out error may be provided from the SSD if the life of the SSD is short. Thus, in the present exemplary embodiment, the difference from the first exemplary embodiment will be described and redundant descriptions will be omitted.

Figure 7:
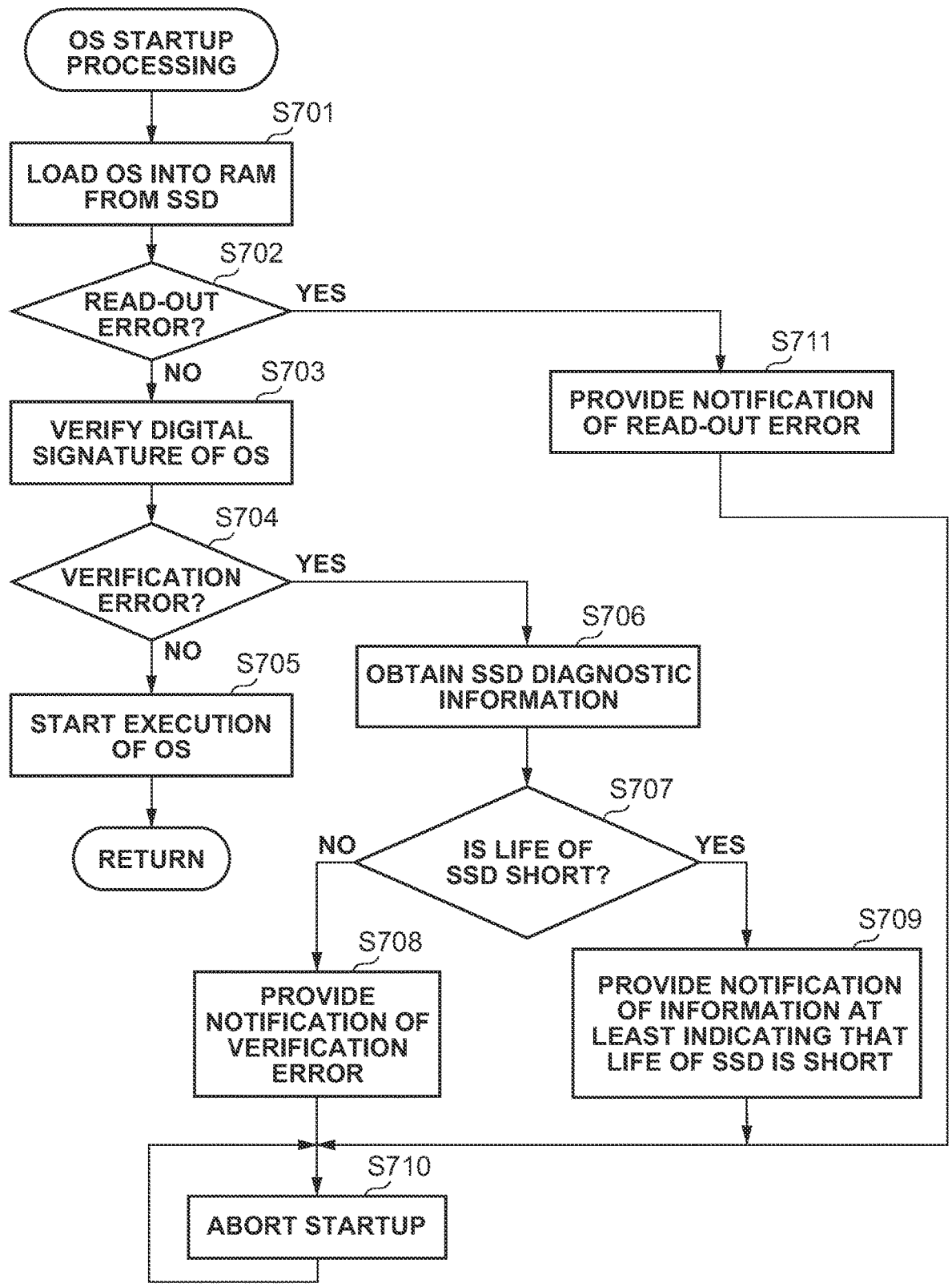
FIG. 7 is another flowchart illustrating the OS startup processing.

FIG. 7 is a flowchart illustrating startup processing on the OS 210 according to the present exemplary embodiment. The flowchart in FIG. 7 corresponds to the flowchart in FIG. 5 according to the first exemplary embodiment and the flowcharts are almost the same. Thus, the difference will be mainly described.

In step S701, the CPU 101 controls the SSD 113 to load the OS 210 into the RAM 103 from the SSD 113.

In step S702, the CPU 101 determines whether notification of a read-out error is provided from the SSD 113. If notification of a read-out error is provided, the loading of the OS 210 into the RAM 103 has failed. If the CPU 101 determines that notification of a read-out error is provided (YES in step S702), the processing proceeds to step S711. If the CPU 101 determines that notification of a read-out error is not provided (NO in step S702), the processing proceeds to step S703. In step S703, since the OS 210 loaded in step S701 is stored in the RAM 103, the CPU 101 verifies the OS 210.

Thereafter, processing from step S703 to step S710 is the same as the processing from step S502 to step S509 in FIG. 5, and a description thereof will thus be omitted.

Figure 3C:

On the other hand, in step S711, i.e., after the CPU 101 determines that the notification of the read-out error is provided from the SSD 113 at the time of loading the OS 210 into the RAM 103, the CPU 101 provides notification that a firmware read-out error has occurred. More specifically, the CPU 101 displays an error code on the LCD panel 112. FIG. 3C is an example of a screen displayed in this case.

The processing then proceeds to step S710. In step S710, the CPU 101 aborts the startup of the image forming apparatus 10, and terminates the processing to stop the image forming apparatus 10.

Figure 8:
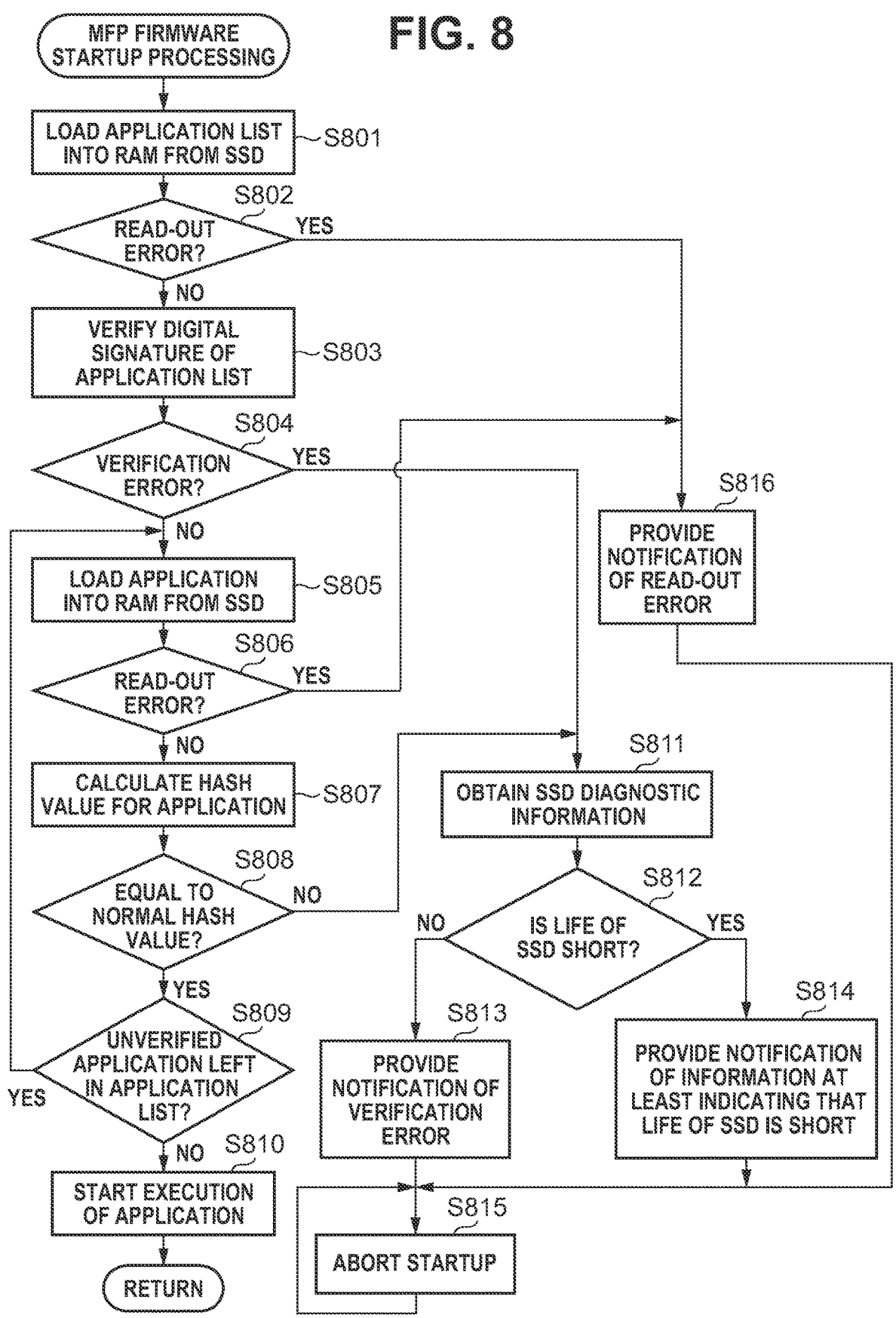
FIG. 8 is another flowchart illustrating the MFP application program startup processing.

FIG. 8 is a flowchart illustrating startup processing on the MFP firmware 220 according to the present exemplary embodiment. The flowchart in FIG. 8 corresponds to the flowchart in FIG. 6 according to the first exemplary embodiment and the flowcharts are almost the same. Thus, the difference will be mainly described, similarly to the description of the flowchart of FIG. 7.

In step S801, the CPU 101 controls the SSD 113 to load the application list 221 into the RAM 103 from the SSD 113.

In step S802, the CPU 101 determines whether notification of a read-out error is provided from the SSD 113. If notification of a read-out error is provided (YES in step S802), the loading of the application list 221 into the RAM 103 has failed and the processing proceeds to step S816. If notification of a read-out error is not provided (NO in step S802), the processing proceeds to step S803. In step S803, the CPU 101 verifies the application list 221 loaded into the RAM 103 in step S801.

In step S803, the CPU 101 verifies the digital signature 222 of the application list 221 using the security chip 15 in order to determine whether the application list 221 is falsified.

In step S804, the CPU 101 makes the determination based on a result of the verification of the digital signature 222. If the CPU 101 determines that a verification error occurs (YES in step S804), the contents of the application list 221 loaded into the RAM 103 are not normal. In this case, the processing proceeds to step S811. If the CPU 101 determines that no verification error occurs (NO in step S804), the application list 221 is normal, and the processing proceeds to step S805.

In step S805, the CPU 101 controls the SSD 113 to load an unverified application program whose name is included in the application list 221 into the RAM 103.

In step S806, the CPU 101 determines whether notification of a read-out error is provided from the SSD 113. If notification of a read-out error is provided (YES in step S806), the loading of the application program into the RAM 103 has failed and the processing proceeds to step S816. If notification of a read-out error is not provided (NO in step S806), the processing proceeds to step S807. In step S807, the CPU 101 verifies the application program loaded in the RAM 103.

Thereafter, processing from step S807 to step S815 is the same as the processing from step S605 to step S613 in FIG. 5, and a description thereof will thus be omitted.

On the other hand, in step S816, i.e., after the CPU 101 determines that the notification of the read-out error is provided from the SSD 113 at the time of loading the application list 221 or the application program into the RAM 103, the CPU 101 provides notification that a firmware read-out error has occurred. More specifically, the CPU 101 displays an error code on the LCD panel 112 as illustrated in FIG. 3C.

Then, the processing proceeds to step S815. In step S815, the CPU 101 aborts the startup of the image forming apparatus 10, and terminates the processing in the flowchart to stop the image forming apparatus 10.

As described above, the image forming apparatus 10 according to the present exemplary embodiment makes it possible to provide notification of the information indicating that the life of the SSD 113 is short in a case where the image forming apparatus 10 includes the SSD 113 having a function of providing notification of a read-out error due to the short life.

In the present exemplary embodiment, in a case where the notification of the read-out error is provided from the SSD 113, the image forming apparatus 10 can promptly interrupt the startup processing without executing time-consuming processing such as the falsification detection processing. In addition, in a case where the notification of the read-out error is provided from the SSD 113, the image forming apparatus 10 enables the user to recognize that the life of the SSD 113 is short before execution of the falsification detection processing, by notifying the user of the read-out error.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-146789, filed Sep. 9, 2021, which is hereby incorporated by reference herein in its entirety.

What is claimed is:

1. An information processing apparatus including a non-volatile semiconductor storage device storing a startup related program including an application included in firmware, the information processing apparatus comprising:
a notification interface (IF) configured to provide notification of information; and
a controller having one or more processors which executes instructions stored in one or more memories, the controller being configured to:
determine whether the application is falsified,
obtain life information of the semiconductor storage device in a case where the controller determines that the application is falsified,
and determine whether the life information satisfies a condition,
wherein the semiconductor storage device stores an application list including management information about the application,
wherein the controller determines whether the application list is falsified, obtain the life information in a case where the controller determines that the application list is falsified, and determines whether the life information satisfies the condition, and
wherein the notification IF provides the notification of at least the information about the remaining life of the semiconductor storage device in a case where the controller determines that the life information satisfies the condition.

2. The information processing apparatus according to claim 1,
wherein the controller is further configured to receive information indicating a read-out error from the semiconductor storage device, and
wherein, in a case where the controller receives the information indicating the read-out error before determining whether the startup related program is falsified, the notification unit provides the notification of the information about the remaining life of the semiconductor storage device.

3. The information processing apparatus according to claim 1, wherein the controller obtains the life information in a case where the controller determines that the startup related program is falsified.

4. The information processing apparatus according to claim 3, wherein, after obtaining the life information, the controller determines whether the life information satisfies the condition.

5. The information processing apparatus according to claim 1, further comprising a printer configured to print an image on a sheet,
wherein the startup related program includes an operating system,
wherein the controller executes the operating system, and executes the application after executing the operating system, and
wherein the printer performs an operation preparation after the execution of the application.

6. The information processing apparatus according to claim 5,
wherein the controller determines whether the startup related is falsified, based on start of startup processing on the operating system in startup processing of the information processing apparatus.

7. The information processing apparatus according to claim 5,
wherein the controller determines whether the startup related program is falsified, based on start of startup processing on the application in startup processing of the information processing apparatus.

8. The information processing apparatus according to claim 1, wherein, in a case where the controller determines that the application list is not falsified, the controller determines whether the application read out from the semiconductor storage device is falsified, based on the application list.

9. The information processing apparatus according to claim 8, wherein, in a case where the controller determines that the application list is falsified, the notification IF provides notification of information indicating that the application list is determined to be falsified, without providing the notification of the information about the remaining life of the semiconductor storage device.

10. The information processing apparatus according to claim 9, wherein the information indicating that the application list is determined to be falsified includes at least one of an error code or an error reason.

11. The information processing apparatus according to claim 1, wherein, in a case where the controller determines that the startup related program is falsified and the life information does not satisfy the condition, the notification IF provides notification of information indicating that the startup related program is determined to be falsified.

12. The information processing apparatus according to claim 11, wherein, in the case where the controller determines that the startup related program is falsified and the life information satisfies the condition, the notification IF provides notification of the information about the remaining life of the semiconductor storage device, and of the information indicating that the startup related program is determined to be falsified.

13. The information processing apparatus according to claim 1, wherein the information about the remaining life of the semiconductor storage device includes at least one of an error code or an error reason.

14. The information processing apparatus according to claim 1,
wherein the life information is information including at least one of a number of read-out errors of the semiconductor storage device, a number of alternative processing-pending sectors of the semiconductor storage device, or a number of alternative processing-completed sectors of the semiconductor storage device, and
wherein the condition is that the life information exceeds a threshold value.

15. The information processing apparatus according to claim 1, wherein the semiconductor storage device is a solid-state drive.

16. The information processing apparatus according to claim 1, further comprising a non-volatile storage device storing image data.

17. A method for controlling an information processing apparatus including a non-volatile semiconductor storage device storing a startup related program including an application included in firmware, and a notification interface (IF) configured to provide notification of information, the method comprising:
determining whether the application is falsified;
obtaining life information of the semiconductor storage device in a case where it is determined that the application is falsified; and
determining whether the life information satisfies a condition wherein the semiconductor storage device stores an application list including management information about the application,
wherein it is determined whether the application list is falsified, the life information is obtained in a case where it is determined that the application list is falsified, and it is determined whether the life information satisfies the condition, and
wherein the notification IF provides the notification of at least the information about the remaining life of the semiconductor storage device in a case where it is determined that the life information satisfies the condition.

* * * * *